(12) United States Patent
Jerger

(10) Patent No.: US 7,487,447 B1
(45) Date of Patent: Feb. 3, 2009

(54) WEB PAGE ZOOM FEATURE

(75) Inventor: John J. Jerger, Oakland, CA (US)

(73) Assignee: Google Inc., Mountain View, CA (US)

( * ) Notice: Subject to any disclaimer, the term of this patent is extended or adjusted under 35 U.S.C. 154(b) by 580 days.

(21) Appl. No.: 11/138,743

(22) Filed: May 25, 2005

(51) Int. Cl.
G06F 17/00 (2006.01)

(52) U.S. Cl. ..................................... 715/252

(58) Field of Classification Search ................ 715/200, 715/252, 273
See application file for complete search history.

(56) References Cited

U.S. PATENT DOCUMENTS

| | | | |
|---|---|---|---|
| 5,854,624 A | 12/1998 | Grant | |
| 5,990,930 A | 11/1999 | Shibata | |
| 6,066,829 A * | 5/2000 | Ishikawa | 219/121.68 |
| 6,211,856 B1 | 4/2001 | Choi et al. | |
| 6,466,203 B2 | 10/2002 | Van Ee | |
| 6,549,217 B1 * | 4/2003 | De Greef et al. | 715/745 |
| 7,019,731 B2 | 3/2006 | Nishiyama | |
| 7,075,512 B1 | 7/2006 | Fabre et al. | |
| 7,107,525 B2 * | 9/2006 | Purvis | 715/244 |
| 2002/0021308 A1 * | 2/2002 | White et al. | 345/800 |
| 2003/0040341 A1 | 2/2003 | Casais | |
| 2003/0182628 A1 * | 9/2003 | Lira | 715/517 |
| 2004/0044966 A1 * | 3/2004 | Malone | 715/530 |
| 2005/0060648 A1 * | 3/2005 | Fennelly et al. | 715/523 |
| 2005/0066286 A1 * | 3/2005 | Makela | 715/764 |
| 2005/0071364 A1 * | 3/2005 | Xie et al. | 707/102 |
| 2005/0149878 A1 * | 7/2005 | White et al. | 715/784 |
| 2005/0268243 A1 * | 12/2005 | Moser | 715/760 |
| 2006/0041340 A1 * | 2/2006 | Stefani | 701/4 |
| 2006/0103667 A1 * | 5/2006 | Amit et al. | 345/619 |
| 2006/0227153 A1 * | 10/2006 | Anwar et al. | 345/660 |
| 2007/0213948 A1 * | 9/2007 | Hornstein | 702/81 |
| 2007/0216687 A1 * | 9/2007 | Kaasila et al. | 345/441 |
| 2007/0288855 A1 * | 12/2007 | Rohrabaugh et al. | 715/760 |
| 2007/0298773 A1 * | 12/2007 | Uematsu et al. | 455/414.2 |
| 2008/0141120 A1 * | 6/2008 | White et al. | 715/252 |
| 2008/0148146 A1 * | 6/2008 | Estrada et al. | 715/255 |

OTHER PUBLICATIONS

Fogaras et al., Scaling Link-Based Similarity Search, ACM May 10-14, 2005, pp. 641-650.*
Yang et al., Internet Browsing: Visualizing Category Map by Fisheye and Fractal Views, IEEE 2002, pp. 1-6.*
Ramos et al., Zliding: Fluid Zooming and Sliding for High Precision Parameter Manipulation, ACM 2005, pp. 143-152.*

* cited by examiner

*Primary Examiner*—Cong-Lac Huynh
(74) *Attorney, Agent, or Firm*—Fish & Richardson P.C.

(57) ABSTRACT

Methods and apparatus, including computer program products, related to a cross-browser compliant web page zoom feature. A method includes receiving a web page with machine-readable instructions and a zoom factor for the web page; processing a document object model representation of the web page in accordance with the machine-readable instructions; and displaying the web page in a web browser according to the document object model representation. In that method, the processing includes modifying parameters pertaining to content in accordance with the zoom factor, if one or more scalable content parameters exist in the document object model representation, and modifying parameters pertaining to layout in accordance with the zoom factor, if one or more scalable layout parameters exist in the document object model representation.

25 Claims, 4 Drawing Sheets

WEB PAGE ZOOM FEATURE

BACKGROUND

The present disclosure relates to data processing by digital computer, and more particularly to a web page zoom feature.

A web page is typically used to deliver content to users of the World Wide Web (the "web"). From a user's perspective, a program referred to as a web browser is typically used to access a web page. Examples of web browsers include Microsoft Corporation's Internet Explorer and Netscape Communications Corporation's Netscape Browser.

As part of the functions performed by a web browser, a web browser interprets code in a web page to determine how the web page should be displayed to a user. For example, a web page can include code that indicates the word "Hello" should be displayed, and formatting for the word should be bold. Following that example, a web browser can interpret the code, and display the world "Hello" as bold text.

Because a web page can include code that indicates how content in the web page should be displayed and a web browser can determine how to display the content in the web page, a combination of a web page and a web browser tends to govern how content is displayed to a user. Consequently, if a web page includes code that indicates content of a web page (e.g., text) should be, for example, displayed at a small size, and a user is sight impaired, a web browser can display content that the user is incapable of reading.

SUMMARY OF THE INVENTION

The present disclosure provides methods and apparatus, including computer program products, that implement techniques for a web page zoom feature.

In one general aspect of the invention, a method of displaying a document includes receiving input that includes a web page with machine-readable instructions, and a zoom factor for the web page; processing a document object model representation of the web page in accordance with the machine-readable instructions; and displaying the web page in a web browser according to the document object model representation. In that method, the processing includes modifying parameters pertaining to content in accordance with the zoom factor, if one or more scalable content parameters exist in the document object model representation, and modifying parameters pertaining to layout in accordance with the zoom factor, if one or more scalable layout parameters exist in the document object model representation.

Embodiments of the invention can include one or more of the following features. The document object model representation can be accessible through a document object model that complies with a World Wide Web Consortium (W3C) Document Object Model standard. The machine-readable instructions can be cross-browser compliant such that the machine-readable instructions are supported by multiple web browsers. The cross-browser compliant instructions can include JavaScript code.

Processing the document object model representation can include traversing the document object model representation. The web page can include code for presenting a user interface through which a user can select a zoom level corresponding to the zoom factor.

The parameters pertaining to content can include parameters pertaining to fonts, images, or both. The parameters pertaining to layout of the web page can include parameters pertaining to margins, borders, padding, or position of objects. The parameters pertaining to content can include parameters pertaining to fonts and images, and the parameters pertaining to layout can include parameters pertaining to margins, borders, padding, and position of objects. Modifying the parameters pertaining to content and layout can include proportionally scaling parameters of the document object model representation. Modifying parameters pertaining to content and layout can include modifying the parameters for a portion of the web page such that only a portion of the web page is resized.

In another aspect of the invention, a computer program, tangibly stored on a computer readable medium, includes instructions that are operable to cause a data processing apparatus to process a document object model (DOM) representation of the web page. The instructions operable to process the DOM representation include instructions operable to modify parameters pertaining to content in accordance with a zoom factor, if one or more scalable content parameters exist in the DOM representation, such that a modified DOM representation is displayed to a user, and modify parameters pertaining to layout in accordance with the zoom factor, if one or more scalable layout parameters exist in the DOM representation, such that a modified DOM representation is displayed to a user.

Embodiments of the invention can include one or more of the following features. The computer program can include instructions that are cross-browser compliant such that the machine-readable instructions are supported by multiple web browsers. The instructions to modify the parameters pertaining to content can modify parameters pertaining to fonts and images, and the instructions to modify the parameters pertaining to layout can modify parameters pertaining to margins, borders, padding, and position of objects. The instructions to modify the parameters pertaining to content and layout can include instructions to scale proportionally the parameters pertaining to content and layout.

The computer program can further include instructions to cause the data processing apparatus to embed in the web page the instructions to process a DOM. The computer program can further include instructions to cause the data processing apparatus to receive a selected zoom factor for a web page.

In another aspect of the invention, a computer program for providing a web page zoom feature includes cross-browser compliant code for instructing a web browser to include, in a web page, a user interface for selecting a zoom level corresponding to a zoom factor and, proportionately scale padding, borders, margins, position of objects, images, and text of the web page in accordance with a selected zoom factor.

Embodiments of the invention can include one or more of the following features. The computer program can further include a second computer program for embedding the cross-browser compliant code into the web page.

In another aspect of the invention, a first web page includes content; first instructions specifying a layout for the content; second instructions operable to process a document object model (DOM) representation of the first web page, where the second instructions can include processing instructions to modify parameters pertaining to content and layout in accordance with a zoom factor; and third instructions operable to display within the first web page a mechanism a user can invoke to execute the second instructions. In that web page, parameters pertaining to content are modified, if one or more scalable content parameters exist in the DOM representation, such that a modified DOM representation is displayed to a user. Also, parameters pertaining to layout are modified in accordance with the zoom factor, if one or more scalable layout parameters exist in the DOM representation, such that a modified DOM representation is displayed to a user.

Embodiments of the invention can include one or more of the following features. The second instructions can be cross-browser compliant such that the second instructions are supported by multiple web browsers.

In another aspect of the invention, a tool is operable to generate a web page, insert code operable to scale parameters pertaining to content and layout of the web page, and insert a mechanism that can be invoked by a user to execute the code operable to scale parameters pertaining to content and layout of the web page.

Embodiments of the invention can include one or more of the following features. The code operable to scale parameters pertaining to content and layout of the web page can be cross-browser compliant such that the code is supported by multiple web browsers.

Embodiments of the invention can be implemented to realize one or more of the following advantages. A web page can include a zoom feature to resize content, layout, or both, of a web page. Resizing a web page does not necessarily involve resizing a window (e.g., a web browser window) in which the web page is drawn. Likewise, resizing a web browser does not necessarily involve resizing a web page displayed within the web browser. For example, in some implementations a web page can be resized and the web browser in which the web page is drawn can stay the same size. As another example, in some implementations, resizing a web browser can resize a web page displayed within the web browser such that the web page is proportionately resized in relation to the resizing of the web browser.

In some implementations, a web page can be resized by controls included in the web page. Resizing a web page can include enlarging (e.g., scaling up) or reducing (e.g., scaling down) the size of the web page. This can be advantageous for a user who is sight-impaired, and who can enlarge the web page to better view content in the web page. Because a web browser can interpret a scaled page, the web browser can add horizontal and vertical scrollbars as need, allowing a user to view content in the web page that is enlarged beyond the original viewable portion of a web page.

Because a zoom feature can be embedded in a web page rather than a browser, a specific browser or modified browser need not be employed to use the zoom feature. For example, a user can use a zoom feature of a web page at a private computer at their home or at a public computer at a library, and the user need not modify a browser or download a special browser to use the zoom feature. Also, a user can use a zoom feature of a web page to enlarge or reduce a web page at a computer with restricted user-access rights as, for example, the ability to modify a web browser at a public library might be restricted to public users.

A zoom feature can be implemented in a web page using machine-readable code that is embedded by someone other than an end-user of a web browser (e.g., a web page software engineer that designed the web page). Thus, a user need not be highly computer literate to use the zoom feature (e.g., the user need not write their own code or modify code to zoom a web page).

A zoom feature can be cross-browser compliant such that the zoom feature can be used in multiple web browsers without requiring modifications for browser-specific implementations. For example, a cross-browser compliant zoom feature can be used in Internet Explorer and Netscape Browser web browsers without requiring modifications for each type of browser.

A zoom feature can advantageously modify multiple parameters pertaining to a web page such that web content is displayed as proportionally resized (e.g., scaled), with little or no distortion. For example, a combination of text size, image size, padding size, border size, and margin size can be proportionately modified such that web content is displayed as proportionately resized, rather than simply modifying, for example, text, which may result in displaying distorted web content to a user. Displaying web content as proportionately resized can also be advantageous for users because resizing is not limited to, for example, resized text, as images can also be resized.

The implementation can be easily modified to support new definitions of the World Wide Web Consortium (W3C) DOM standard as the standard evolves. Since some implementations can adhere to the W3C DOM standard, or other standards, and be browser independent, those implementations might work in new browsers that will be developed in the future.

One implementation of the invention provides all of the above advantages.

Details of one or more implementations of the disclosure are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Overview

A web page can include a zoom feature that resizes a web page, including content and layout of a web page. A web page generally includes machine-readable code that describes content and layout of the content. Web pages can be drafted in different types of machine-readable code, including, but not limited to, HyperText Markup Language (HTML). Web pages can include programs. For example, a web page can include programs written in JavaScript. Examples of content in a web page include text and images. Examples of layout in a web page include padding (e.g., padding between content), margins (e.g., margins used around borders), borders (e.g., a border defining a rectangular shape around a rectangular image), and position of objects (e.g., relative position of content, such as a table cell, within a web page). Resizing a web page can include enlarging a web page, reducing the size of a web page, or both, such that a web page is "zoomed in," "zoomed out," or both.

Throughout this description, resizing (e.g., scaling) a web page is not necessarily limited to resizing all of a web page or resizing all parameters pertaining to a web page. For example, one of several "frames" of a web page can be resized and the remainder of the frames can stay in their original size. As another example, only images and text can be resized and layout of a web page need not be resized.

Displays of a Web Page

Figure 1A:
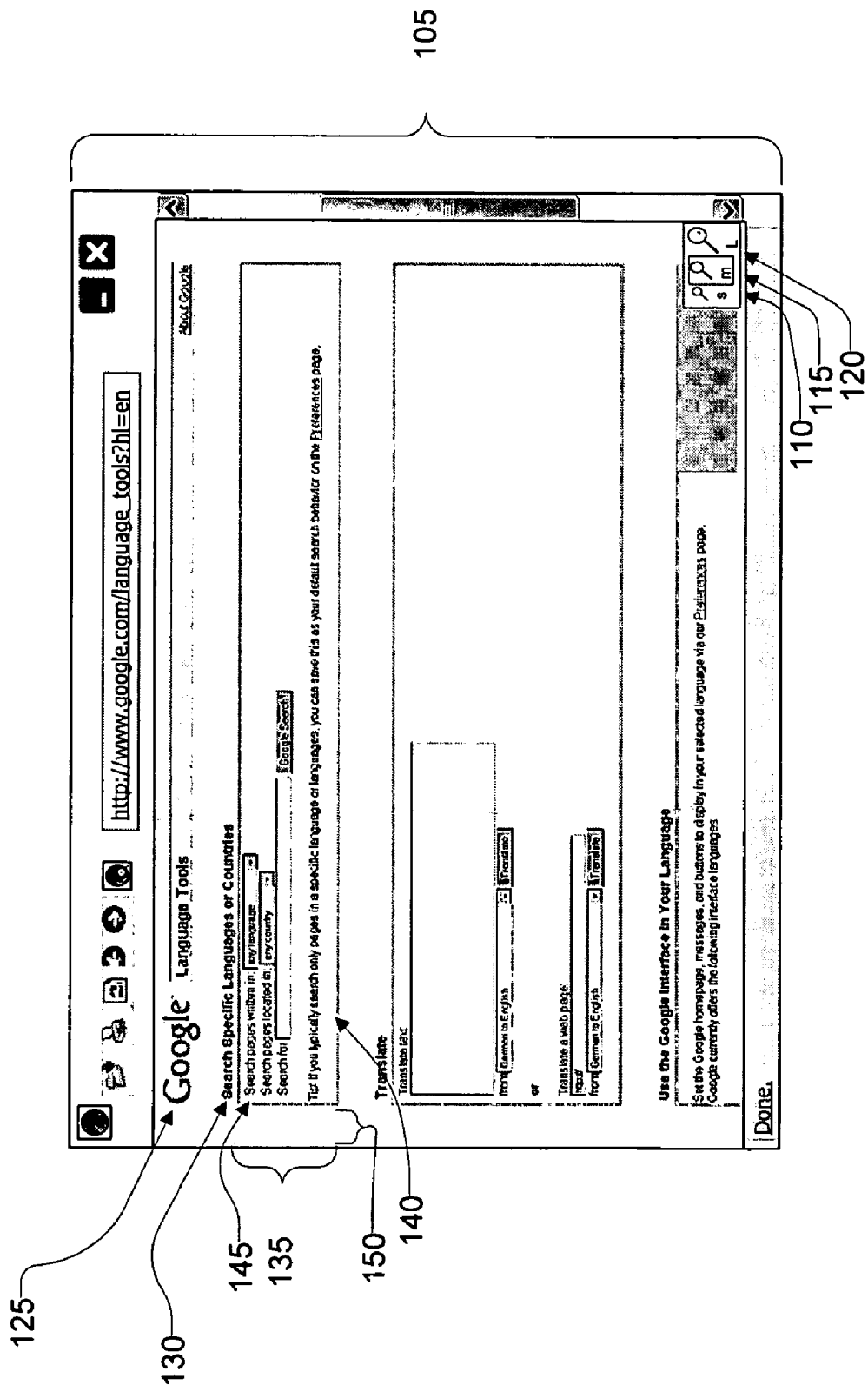
FIGS. 1A and 1B show displays of a web page in a web browser in accordance with one embodiment of the invention.
Figure 1B:
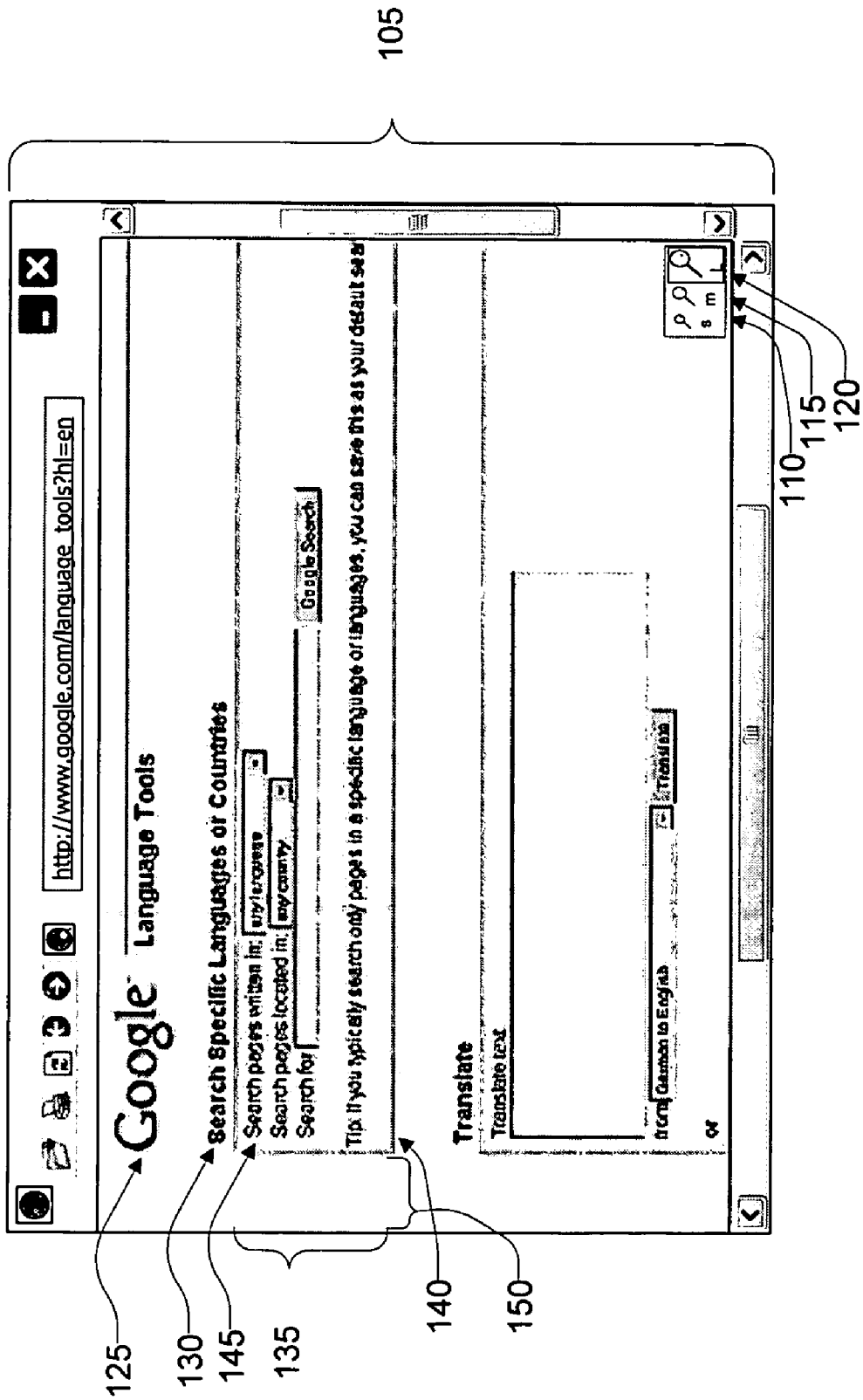

FIGS. 1A and 1B show displays of a web page in a web browser 105 in accordance with one embodiment of the invention. The exemplary web page shown in FIGS. 1A and 1B include three icons 110, 115, 120 that provide a user interface for resizing the content and layout of the web page according to three fixed sizes, denoted as "s" (for small), "m" (for medium), and "L" (for large). The three icons 110, 115, 120 that provide a user interface are part of a web page, rather than being part of the web browser. If a user were to use a mouse-driven interface to click one of the three icons 110, 115, 120, the content and layout of the representation of the web page that is displayed to the user would be resized.

To resize the content and layout of a web page representation displayed to a user, the web page (e.g., a web page written in HTML code) includes JavaScript code that includes instructions that can cause a resizing by the browser 105. In operation, the content and layout of the representation is modified as follows. A user can click one of the three icons 110, 115, 120 to select a zoom factor (e.g., a predetermined zoom factor associated with each icon) that is received as input to JavaScript code. That JavaScript code includes instructions that can traverse what is referred to as a document object model (DOM) representation of the web page and modify the representation of the web page. A DOM can be a browser- and platform-independent application programming interface for interacting with a representation of the web page generated by a computer. An example DOM can support a World Wide Web Consortium (W3C) DOM standard, which is browser independent (e.g., JavaScript code can interact with a DOM and cause similar affects to a web page regardless of a type of web browser (e.g., a Mozilla-based or Internet Explorer web browser) that interprets JavaScript code). The DOM is an interface for a DOM representation that is generated by a web browser. As part of traversing the DOM, the code modifies parameters pertaining to content and layout of a DOM representation according to the selected zoom factor. The modified DOM representation can be displayed in the browser 105. Because, in the example, the DOM representation is modified, the web page need not be modified (e.g., HTML code need not be modified); however, other implementations can modify the web page (instead of, or in addition to, an object model representation of the web page) when a web page is to be resized.

The content and layout of the web page displayed in FIG. 1A is enlarged in FIG. 1B as an example of how a modified representation of a web page can appear to a user. The content that is enlarged includes an image 125 and text 130. In some implementations, content other than images and text can be enlarged. For example, a Macromedia, Incorporated Flash object or a streaming video plug-in could be enlarged. The properties of the web page pertaining to layout that are enlarged include borders, padding, margins. For example, around a table element 135, a border 140, padding 145, and margin 150 are enlarged. In addition, the position of content can be scaled. The content and layout properties of the web page are enlarged proportionally according to a fixed zoom factor that corresponds to one of the user interface icons 110, 115, 120 for resizing of a web page.

Changes to layout properties of the DOM representation can be implemented in JavaScript by changing inline style sheet parameters. Parameters of a style sheet tend to follow a box-styled representation of elements. In such a representation, an element of a DOM representation corresponds to an element in a web page and the term "box" is used to refer to the box of an element that is formed by a box-shaped border that can be around an element; box-shaped padding that can be between an element and a border; and a box-shaped margin that can be around a border and forms a space between elements. In an example box-styled representation of elements, margins, borders, and padding can be the names of parameters for elements in a DOM representation that correspond to layout properties for margins, borders, and padding. Changing the values for those parameters on an element-by-element basis does result in a proportionately resized DOM representation of a web page. In some implementations, inline style sheet parameters need not be changed to change the properties of a web page that correspond to margins, borders, and padding of elements. For example, a combination of HTML attribute values could be changed. For example, a combination of different parameters (e.g., HTML attribute values) could pertain to borders and those parameters could be changed to cause a resizing of borders. Thus, "parameter" is not necessarily limited to a style sheet parameter and can more broadly refer to a measurement of a property or attribute for any machine-readable language. Also, parameter as used in this description need not be limited to an actual parameter (e.g., a value 5), and includes a formal parameter (e.g., 'x'). In some implementations, a web page need not be resized proportionately. Style sheet parameters that are changed can be parameters that are from an embedded or external style sheet.

Although in FIGS. 1A and 1B, icons are used to receive a selection of a zoom factor, other forms of user interfaces can be embedded in a web page. For example, a text field can be used to receive a zoom factor (e.g., as a percentage, such as 200%) as input. As another example, a slider with a control corresponding to a gradually changing zoom factor could be a user interface. In some implementations, the zoom factor need not be selected through a web page that is resized. For example, the first time a web site is accessed, a user can register with the web site and select a zoom factor to be used on accesses to web pages available through the web site. Then, in subsequent visits to the web site, registration information could be used to determine a zoom factor to embed in a web page that is sent to a user, and that zoom factor can be used.

Although many properties of a web page corresponding to image size, text size, borders, padding, and margins, as displayed in FIG. 1A are proportionately resized in FIG. 1B, in some implementations, fewer or more properties can be proportionately resized. For example, image and text size can be enlarged, and layout properties, such as padding and margins, might not be enlarged.

In the example embodiment, the use of JavaScript code to cause the resizing of the web page is advantageous as JavaScript is supported by many types of browsers such that the web page zoom feature can be cross-browser compliant. However, in other implementations, other programming languages can be used and those languages might not be cross-browser compliant.

System to Generate and Distribute Web Pages

Figure 2:
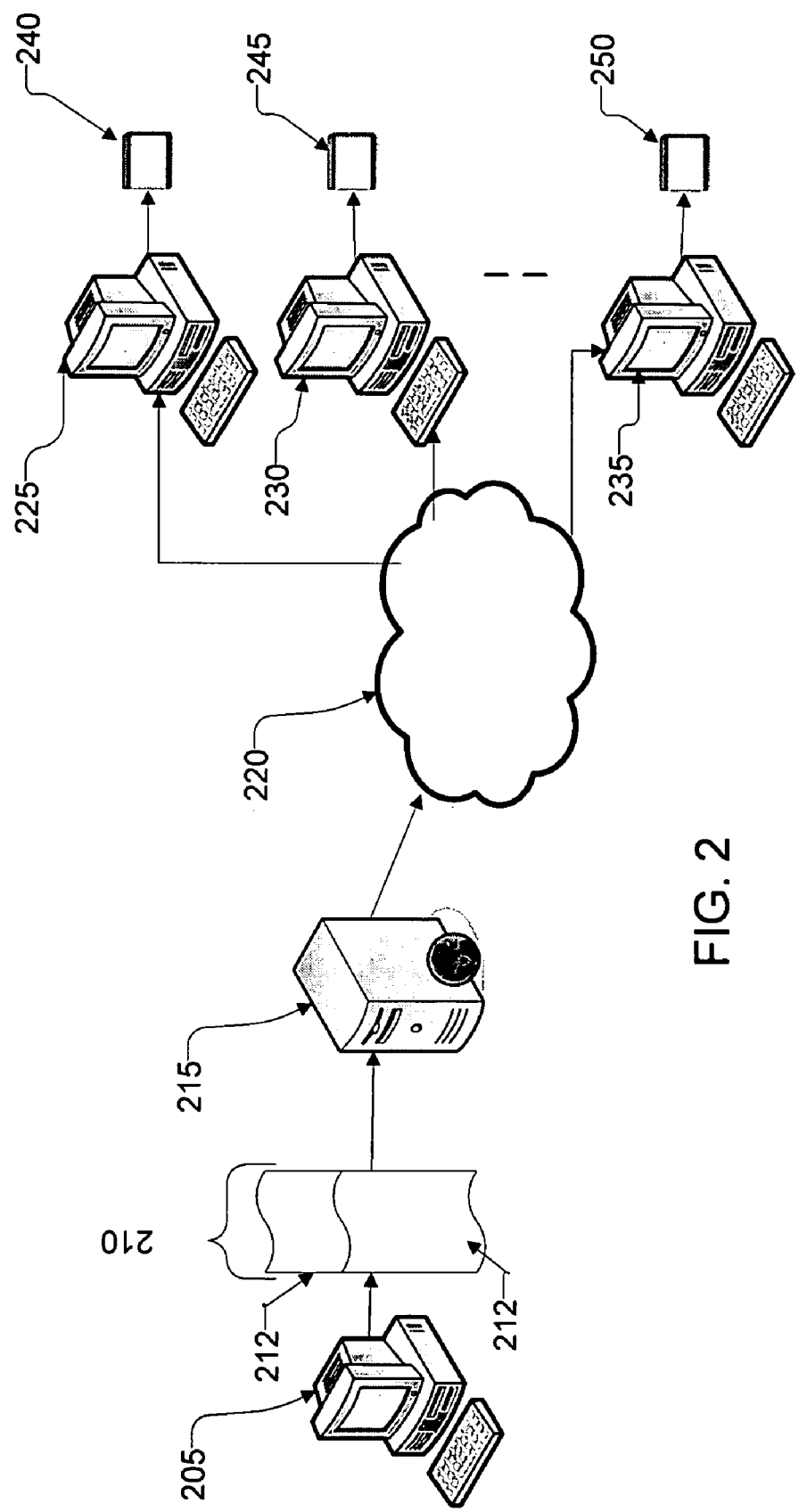
FIG. 2 illustrates a system that can be used to generate and distribute web pages in accordance with one embodiment of the invention.

FIG. 2 illustrates a system that can be used to generate and distribute web pages in accordance with one embodiment of the invention. The system includes a first computer 205 that is used to generate web pages, such as an example web page 210 that includes code implementing a zoom feature. To generate web pages, the computer 205 includes a web page editing program that generates web pages and has a What You See Is What You Get (WYSIWYG) interface. The program used for editing web pages need not be limited to a WYSIWYG interface. For example, a WYSIWYG interface might be substituted with, or be used in addition to, a text-editing interface.

The web page 210 that is generated by the computer 205 includes the zoom feature as a section of embedded code 212, along with the web page code 214 that describes components of the web page other than the zoom feature. When a web page is to be persisted, there is an option in the program to include the zoom feature in the persisted web page. When the option is chosen, the program on the computer 205 automatically embeds the zoom feature into the web page without making web page-specific modifications. In this fashion, the zoom feature is generic in the sense that it can be embedded into any web page, without requiring special considerations for specific web pages. For example, journalists that generate web pages can generate various web pages for different news stories, using different layouts and combinations of web page elements, and can embed the generic code for a zoom feature in the various web pages.

Web pages that are generated on the first computer 205 can be persisted on a web server 215. The web server 215 acts as a distribution point from which web pages can be accessed, over the network 220, by user computers 225, 230, 235. The web server 215 could be one of many web servers used for a web site, or could be the only web server used for a web site. The web pages that can be served from the web server 215 need not be limited to web pages generated by the first computer 205, or web pages that have a zoom feature. For example, many different computers could be used to generate web pages for the web server 215, and those web pages can include a mix of web pages that do and do not include a zoom feature.

The network 220 from which web pages are accessed could be any type of network, including, as examples, a large, public network, such as the Internet, or a small, private intranet.

Web pages that are accessed by the user computers 225, 230, 235 can be displayed on their respective web browsers 240, 245, 250. Displaying web pages on the web browsers 225, 230, 235 can include a display of a user interface control for a zoom feature, such as the example user interface control for a zoom feature discussed with reference to FIGS. 1A and 1B. The user computers 225, 230, 235 can be different types of computers, include different operating systems, and have different user-access restrictions. For example, the first user computer 225 could be a home computer with unlimited user access that includes an operating system based on Microsoft Corporation's Windows platform and the second user computer 230 could be a computer at a public university that prohibits public users from installing software. Because the zoom feature is embedded in a web page such that the zoom feature need not require a specific browser or modifications to a browser, each of the browsers 240, 245, 250, on the user computers 225, 230, 235 can support the zoom feature.

The web browsers 240, 245, 250 that are used by the user computers 225, 230, 235 can include a mix of different platforms of browsers and different versions of browsers. For example, the first browser 240 could be an Internet Explorer web browser, the second web browser 245 could be a Netscape Browser web browser, and the third web browser 250 could be a Mozilla-based Firefox web browser. Following the example, if the user computers 225, 230, 235 request a same web page that has a cross-browser compliant zoom feature, the web browsers 240, 245, 250 could support the zoom feature, and the web page need not include browser-specific code to ensure the zoom feature is supported by the web browsers 240, 245, 250.

Although the embedded code used for the zoom feature discussed with reference to FIG. 2 is generic such that it can be included in any web page with no web-page specific modifications, some implementations can vary. For example, the zoom feature might be coded for a specific web page. In other implementations an editor with a user interface need not be used to embed a zoom feature. For example, a search engine could provide an option for users to have a zoom feature embedded in web pages served as search results.

Process of Displaying a Web Page

Figure 3:
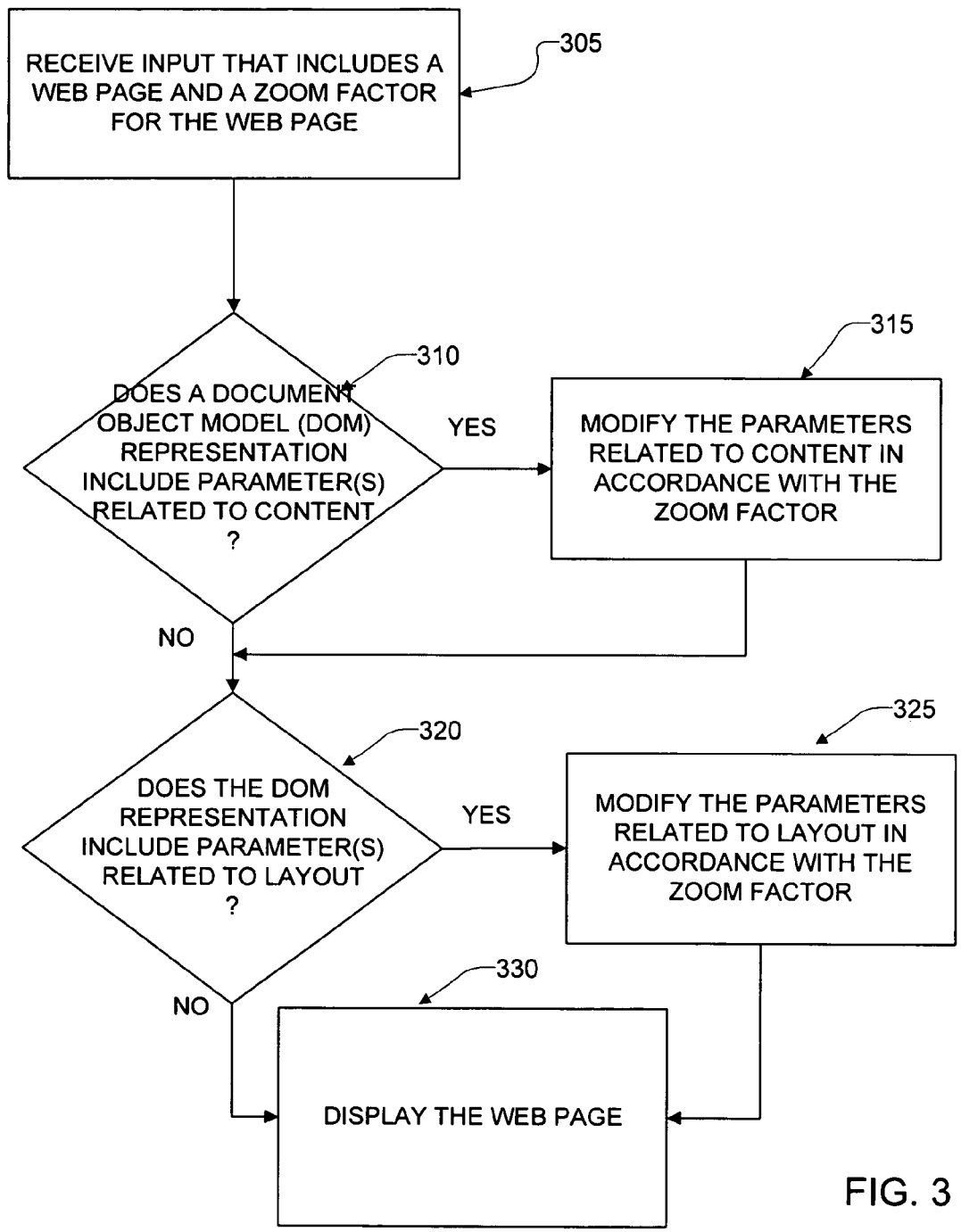
FIG. 3 is a flowchart of a process of displaying a web page in accordance with one embodiment of the invention.

FIG. 3 is a flowchart of a process of displaying a web page in accordance with one embodiment of the invention. The web page that is displayed includes a zoom feature and can be resized in accordance with a zoom factor. The process of displaying a web page according to the flowchart can be performed by a web browser that can interpret web pages and cross-browser compliant machine-readable code (e.g., JavaScript). For example, the process could be performed by an Internet Explorer web browser.

At 305, the web page and the zoom factor are received as input. The web page and the zoom factor can be received together as a single input, or the web page and the zoom factor could be received separately. For example, the web page could include the zoom factor as a default zoom factor to be used, or the web page could be received and a user can select a zoom factor to use for the web page from a user interface control in the web page. The web page and the zoom factor can be received as input at a web browser. For example, the web page could be received after a request for the web page is made by a user typing in a uniform resource locator (URL) for a web site that hosts the web page.

In the processes that will be described with reference to 310 through 325, a document object model (DOM) representation of a web page can be manipulated. A DOM is an application programming interface for manipulating a DOM representation of a web page. A DOM could be a standards-defined interface such as a DOM that supports the World Wide Web Consortium (W3C) DOM standard that is supported by multiple types of browsers. Because different browsers can support a similar DOM interface, DOM representations can be manipulated using cross-browser compliant code.

At 310, a determination is made as to whether a DOM representation of the received web page includes parameters pertaining to content (e.g., scalable content parameters, such as text size and image size). Parameters pertaining to content could include, for example, parameters pertaining to images, text, or both.

If the DOM representation includes parameters pertaining to content, those parameters are modified in accordance with the zoom factor, at 315. Modifying the parameters in accordance with the zoom factor can include, for example, multiplying the size of an image by the zoom factor to calculate a new image size, which may be enlarged from or made smaller than a previous image size. Modifying the parameters includes replacing the values of one or more parameters in the DOM representation. For example, when resizing an image, a parameter pertaining to the height of an image and a parameter pertaining to the width of the image can be modified.

If the DOM representation does not include parameters pertaining to content, or parameters pertaining to content have been modified in accordance with the zoom factor, a determination is made as to whether the DOM representation includes parameters pertaining to layout, at 320. Those parameters pertaining to layout (e.g., scalable layout parameters, such as border size and padding size) are modified in accordance with the zoom factor at 325. Parameters pertaining to layout can include borders, margins, and padding. Although borders, margins, and padding are style parameters for a DOM representation in accordance with a W3C DOM standard, the parameters pertaining to layout can include any combination of implemented parameters of a DOM representation that provide a similar effect. Thus, the parameters pertaining to borders, margins, and padding can be broader than the borders, margins, and padding style parameters according to a W3C DOM standard. Also, although these three layout properties are discussed, all of the properties need not be modified and any combination of other properties could be modified, including to, or instead of, those properties.

At 330, the web page is displayed. Displaying the web page could include refreshing the web page to reflect changes that have been made to the DOM representation of the web page.

Although the sub-processes performed from 310 to 325 are shown as being performed by traversing a DOM representation of the web page to determine if there are parameters pertaining to content prior to determining whether there are parameters pertaining to layout, the order need not be followed. Additionally, a determination as to whether parameters pertaining to content for multiple elements need not be made prior to determining if parameters pertaining to layout are available for other elements. For example, the DOM representation can be traversed on an element-by-element basis, in which case, a determination can be made for parameters pertaining to content and layout for one element separately from determinations for another element.

The disclosure and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A program can be stored in an electronic document (e.g., a JavaScript program can be stored in a HTML file). An electronic document does not necessarily correspond to a file. A document may be stored in a portion of a file that holds other documents, in a single file dedicated to the document in question, or in multiple coordinated files. A computer program can be deployed to be executed on one computer or on multiple computers at one site or distributed across multiple sites and interconnected by a communication network.

A web page is not necessarily limited to a single file. For example, from a perspective of a viewer of a web page, a web page can include multiple files, including, HTML files, image files, and files for other types of content. Consequently, referring to "a web page" can include referring to multiple HTML pages. For example, a web page including frames may include a first HTML page that includes references to other HTML pages that should be frames, and the other HTML pages that are frames.

The processes and logic flows described in this specification can be performed by one or more programmable processors executing one or more computer programs to perform functions by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component (e.g., a data server), a middleware component (e.g., an application server), or a front-end component (e.g., a client computer having a graphical user interface or a web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, operations can be performed in a different order and still achieve desirable results. As one example, the process depicted in FIG. 3 does not require the particular order shown, or sequential order, to achieve desirable results (e.g., the operations described with reference to 310 and 315 can be performed after the operations described with reference to 320 and 325). In certain implementations, multitasking and parallel processing may be preferable.

In some implementations, other properties of a web page, in addition to, or instead of, the size of content and layout could be changed. As examples, the color of links could be modified in relation to surrounding text to distinguish links, or the color of text could be modified to avoid the use of certain colors to increase the readability of text for persons with color perception difficulties.

A zoom feature can be implemented in different types of environments. For example, a software tool that is used to generate web pages can include the zoom feature in a preview browser. Following that example, the preview browser can use the zoom feature to resize a web page in response to a resizing of the preview browser. Consequently, if a user resizes a preview browser, the web page can be resized automatically, to reflect a resizing of the preview browser. To implement an example preview browser, a user interface for selecting a zoom factor need not be shown. For example, a zoom factor can be calculated based on the window size of the preview browser and a program can receive a calculated zoom factor as input for processing a document object model of a web page, where the processing results in a resized web page.

Other embodiments are within the scope of the following claims.

What is claimed is:

1. A method of displaying a document, the method comprising:
    receiving input comprising:
        a web page comprising machine-readable instructions, and
        a zoom factor for the web page;
    processing a document object model representation of the web page in accordance with the machine-readable instructions, wherein at least one scalable content parameter or at least one scalable layout parameter exists in the document object model, and wherein the processing comprises:
        if one or more scalable content parameters exist in the document object model representation, modifying parameters pertaining to content in accordance with the zoom factor; and
        if one or more scalable layout parameters exist in the document object model representation, modifying parameters pertaining to layout in accordance with the zoom factor; and
    displaying the web page in a web browser according to the document object model representation.

2. The method of claim 1, wherein the document object model representation is accessible through a document object model that complies with a World Wide Web Consortium (W3C) Document Object Model standard.

3. The method of claim 1, wherein the machine-readable instructions are cross-browser compliant such that the machine-readable instructions are supported by a plurality of types of web browsers.

4. The method of claim 3, wherein the cross-browser compliant instructions comprise JavaScript code.

5. The method of claim 1, wherein the processing the document object model representation comprises traversing the document object model representation.

6. The method of claim 1, wherein the web page comprises code for presenting a user interface through which a user can select a zoom level corresponding to the zoom factor.

7. The method of claim 1, wherein the parameters pertaining to content comprise parameters pertaining to fonts, images, or both.

8. The method of claim 1, wherein the parameters pertaining to layout of the web page comprise one or more of parameters pertaining to margins, borders, padding, or position of objects.

9. The method of claim 1, wherein the parameters pertaining to content comprise parameters pertaining to fonts and images, and the parameters pertaining to layout comprise parameters pertaining to margins, borders, padding, and position of objects.

10. The method of claim 1, wherein modifying the parameters pertaining to content and layout comprises proportionally scaling parameters of the document object model representation.

11. The method of claim 1, wherein modifying the parameters pertaining to content and layout comprise modifying the parameters pertaining to content and layout for a portion of the web page such that only a portion of the web page is resized.

12. A computer storage medium having a computer program stored thereon, the computer program comprising instructions operable to cause a data processing apparatus to:
    process a document object model (DOM) representation of web page, wherein the instructions operable to process the DOM representation comprise instructions operable to:
        if one or more scalable content parameters exist in the DOM representation, modify parameters pertaining to content in accordance with a zoom factor such that a modified DOM representation is displayed to a user; and
        if one or more scalable layout parameters exist in the DOM representation, modify parameters pertaining to layout in accordance with the zoom factor such that a modified DOM representation is displayed to a user.

13. The computer storage medium of claim 12, wherein the computer program comprises instructions that are cross-browser compliant such that the instructions are supported by a plurality of types of web browsers.

14. The computer storage medium of claim 12, wherein the instructions to modify the parameters pertaining to content modify parameters pertaining to fonts and images, and the instructions to modify the parameters pertaining to layout modify parameters pertaining to margins, borders, padding, and position of objects.

15. The computer storage medium of claim 12, wherein the instructions to modify the parameters pertaining to content and layout comprise instructions to scale proportionally the parameters pertaining to content and layout.

16. The computer storage medium of claim 12, further comprising instructions to cause the data processing apparatus to embed in the web page the instructions to process a DOM.

17. The computer storage medium of claim 12, further comprising instructions to cause the data processing apparatus to receive a selected zoom factor for a web page.

18. A computer storage medium comprising a first computer program encoded on the computer storage medium, the first computer program comprising:
    cross-browser compliant code for instructing a web browser to:
        include, in a web page, a user interface means for selecting a zoom level corresponding to a zoom factor; and
        proportionately scale padding, borders, margins, position of objects, images, and text of the web page in accordance with a selected zoom factor.

19. The computer storage medium of claim 18, further comprising a second computer program encoded on the computer storage medium, for embedding the cross-browser compliant code means into the web page.

20. A computer storage medium having a first web page stored on the computer storage medium, the first web page comprising:
  content;
  first instructions specifying a layout for the content;
  second instructions operable to:
    process a document object model (DOM) representation of the first web page, wherein the second instructions comprise processing instructions to:
      if one or more scalable content parameters exist in the DOM representation, modify parameters pertaining to content in accordance with a zoom factor such that a modified DOM representation is displayed to a user; and
      if one or more scalable layout parameters exist in the DOM representation, modify parameters pertaining to layout in accordance with the zoom factor such that a modified DOM representation is displayed to a user; and
  third instructions operable to display within the first web page a mechanism a user can invoke to execute the second instructions.

21. The computer storage medium of claim 20, wherein the second instructions are cross-browser compliant such that the second instructions are supported by a plurality of types of web browsers.

22. A computer storage medium having a computer program stored on the computer storage medium, the computer program comprising instructions operable to cause a data processing apparatus to:
  generate a web page;
  insert, into the web page, code operable to scale parameters pertaining to content and layout of the web page; and
  insert, into the web page, a mechanism that can be invoked by a user to execute the code operable to scale parameters pertaining to content and layout of the web page.

23. The computer storage medium of claim 22, wherein the code operable to scale parameters pertaining to content and layout of the web page is cross-browser compliant such that the code is supported by a plurality of types of web browsers.

24. A system comprising:
  one or more computers programmed to perform operations comprising:
    generating a first web page, the first web page including:
      content;
      first instructions specifying a layout for the content;
      second instructions operable to:
        process a document object model (DOM) representation of the first web page, wherein the second instructions comprise processing instructions to:
          if one or more scalable content parameters exist in the DOM representation, modify parameters pertaining to content in accordance with a zoom factor such that a modified DOM representation is displayed to a user; and
          if one or more scalable layout parameters exist in the DOM representation, modify parameters pertaining to layout in accordance with the zoom factor such that a modified DOM representation is displayed to a user; and
        third instructions operable to display within the first web page a mechanism a user can invoke to execute the second instructions; and
    sending the generated web page to a client device.

25. A system comprising:
  one or more computers programmed to perform operations comprising:
    generating a web page;
    inserting, into the web page, code operable to scale parameters pertaining to content and layout of the web page;
    inserting, into the web page, a mechanism that can be invoked by a user to execute the code operable to scale parameters pertaining to content and layout of the web page; and
    sending the generated web page to a client device.

* * * * *

UNITED STATES PATENT AND TRADEMARK OFFICE
CERTIFICATE OF CORRECTION

PATENT NO. : 7,487,447 B1  
APPLICATION NO. : 11/138743  
DATED : February 3, 2009  
INVENTOR(S) : John J. Jerger Page 1 of 1

It is certified that error appears in the above-identified patent and that said Letters Patent is hereby corrected as shown below:

Col. 12 line 18

In Claim 12, after "of" insert -- a --

Col. 12 line 65

In Claim 19, after "program" insert -- , --

Signed and Sealed this

Fourteenth Day of April, 2009

JOHN DOLL  
*Acting Director of the United States Patent and Trademark Office*

UNITED STATES PATENT AND TRADEMARK OFFICE
CERTIFICATE OF CORRECTION

PATENT NO. : 7,487,447 B1  Page 1 of 1
APPLICATION NO. : 11/138743
DATED : February 3, 2009
INVENTOR(S) : Jerger It is certified that error appears in the above-identified patent and that said Letters Patent is hereby corrected as shown below:

On the Title Page

Item [*] Notice: Subject to any disclaimer, the term of this patent is extended or adjusted under 35 USC 154(b) by 580 days Delete the phrase "by 580 days" and insert -- by 834 days --

Signed and Sealed this

Fourth Day of May, 2010

David J. Kappos
*Director of the United States Patent and Trademark Office*